US006476896B1

(12) United States Patent
Liu

(10) Patent No.: US 6,476,896 B1
(45) Date of Patent: Nov. 5, 2002

(54) STRUCTURE OF A MULTI-DOMAIN WIDE VIEWING ANGLE LIQUID CRYSTAL DISPLAY

(75) Inventor: Hong-Da Liu, Juipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/575,840

(22) Filed: May 22, 2000

(30) Foreign Application Priority Data

Mar. 31, 2000 (TW) .......................................... 89104042

(51) Int. Cl.$^7$ ...................... G02F 1/1337; G02F 1/1335
(52) U.S. Cl. ........................................ 349/129; 349/121
(58) Field of Search ............................... 349/129, 143, 349/130, 117, 96

(56) References Cited

U.S. PATENT DOCUMENTS

| | | | |
|---|---|---|---|
| 5,309,264 A | | 5/1994 | Lien et al. .................... 399/129 |
| 5,610,743 A | * | 3/1997 | Tsai ............................ 349/129 |
| 5,907,380 A | | 5/1999 | Lien ........................... 399/129 |
| 5,953,091 A | * | 9/1999 | Jones et al. .................. 349/129 |
| 6,097,464 A | * | 8/2000 | Liu ............................. 349/130 |
| 6,256,080 B1 | * | 7/2001 | Colgan et al. ............... 349/129 |

OTHER PUBLICATIONS

EuroDisplay '99, Sep. 1999, Berlin, Germany, The 19th International Display Research Conference.

* cited by examiner

Primary Examiner—Toan Ton

(57) ABSTRACT

A multi-domain wide viewing angle liquid-crystal display (LCD) has a plurality of superimposed spacing wall-bump structures formed on a pair of parallel substrates. Each superimposed spacing wall-bump (SSWB) structure includes a surrounding wall-bump structure formed around a pixel area on a first substrate and a central wall-bump structure formed in a central portion of the pixel area ore a second substrate. Wall-bumps of many different shapes can be used for the central wall-bump structure. The superimposed spacing wall-bump structure provides pre-tilted angles for liquid crystal molecules and results in orderly alignment of liquid crystal molecules when an external voltage is applied. By means of the fringe field effect to tilt liquid crystal molecules, a multi-domain LCD cell can be established after a voltage is applied. The manufacturing method for the SSWB needs neither rubbing process nor polymer stabilized ultraviolet curing process. The multi-domain wide viewing angle LCD provides fast response speed for its application and higher transmittance than conventional multi-domain wide-viewing angle LCDs.

25 Claims, 13 Drawing Sheets

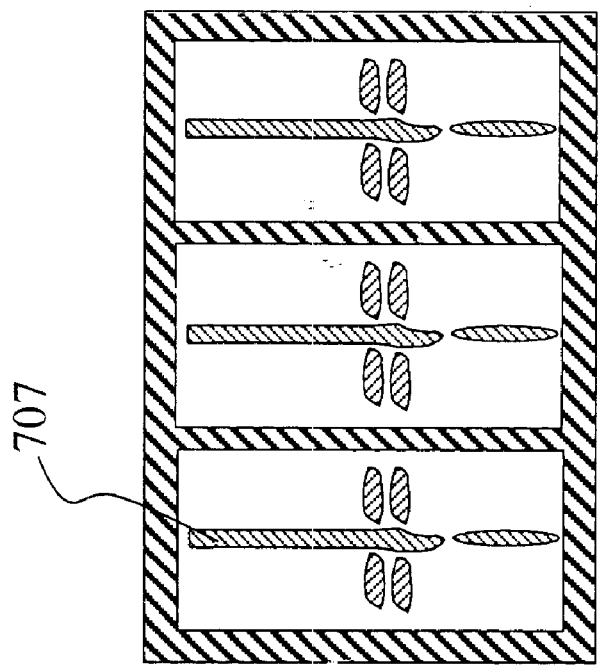
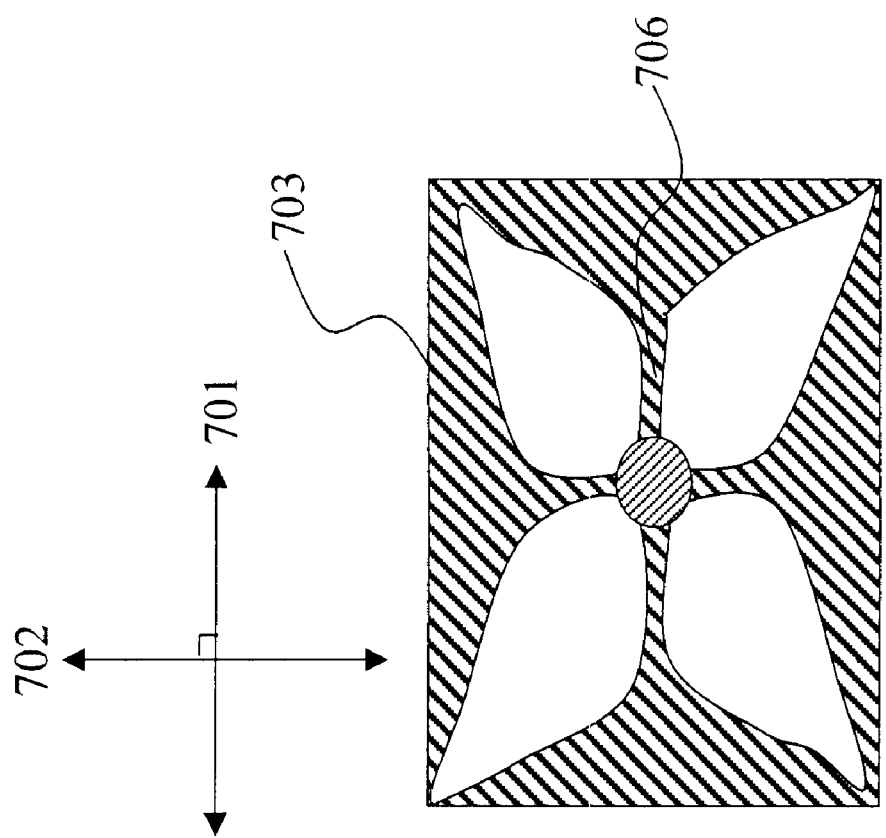
FIG. 7 (a)
FIG. 7 (b)

| LCD | TN type | BSE type | Invention |
|---|---|---|---|
| aperture ratio | 47% | 47% | ≥60% |
| transmittance | 4.8% | 2.9% | 3.5% |
| light intensity | 100% | 60% | >70% |
| spacer spraying | yes | yes | no |
| total response time | very slow | very fast | very fast |
| rubbing process | yes | no | no |

FIG. 10

STRUCTURE OF A MULTI-DOMAIN WIDE VIEWING ANGLE LIQUID CRYSTAL DISPLAY

FIELD OF THE INVENTION

The present invention relates generally to a structure of a multi-domain wide-viewing angle liquid crystal display (MD-WVA-LCD), and more specifically to a structure of a multi-domain wide-viewing angle-liquid crystal display with a superimposed spacing wall-bump structure.

BACKGROUND OF THE INVENTION

The market for liquid crystal display (LCD) panels is increasing rapidly, especially in their applications to notebook PCs and monitors. When LCD panels of larger size and higher resolution are used for desktop monitors, wide-viewing angles (WVA) and fast response time become very critical in meeting the monitors requirements. In addition to contrast ratio with respect to different viewing angles, gray-scale inversion, colorimetry, and the optical response of an LCD are important features of a high quality LCD panels. However, the cost associated with designing and manufacturing a panel also needs to be considered.

Controlling liquid crystal domains is the most important technology in obtaining a wide-viewing angle for an LCD. In the technology for flat panel display, each pixel is divided into several domains to compensate for the asymmetry in optics so as to increase the viewing angle of an LCD panel. Most of the conventional LCDs are 90° twisted nematic (TN) LCDs having an LCD panel and crossed polarizers attached outside. The drawbacks of the conventional LCDs include narrow viewing angles (±40° horizontally and ±30° vertically), slow response (about 50ms), and large color dispersion. Therefore, it is difficult to make high quality LCD panels. Also, the black matrix of the twisted nematic LCD must cover the disclination lines generated by reverse-twisted and reverse-disclined liquid crystal molecules. In addition, the rubbing process required in manufacturing the panels causes electric static damage (ESD) and particle pollution.

Because of the demand in high quality LCD panels with wide-viewing angles, the structure of vertically aligned multi-domain LCDs has been developed. For instance, Fujitsu's multi-domain vertically aligned (MVA) structure has W-shaped bump structure as shown in FIG. 1. The W-shaped bump structure is formed on the upper and lower substrates to form a multi-domain LCD cell of multiple independent directions. Its LCD panel has a wider viewing angle and smaller color dispersion than conventional LCD Ad panels but only about 55% light intensity of a conventional TN LCD. Also it may generate reverse disclination lines because the angle between its bump and its pixel electrode is formed by 45°. Moreover, the horizontal gap between the upper and the lower bumps must be less than 30 $\mu$m. It needs high precision to align. Therefore, the design specification is not easy and the process window is smaller.

U.S. Pat. No. 5,907,380 also discloses a structure of liquid crystal molecules that uses thin walls to provide a lateral fringe field to control the tilt direction of the liquid crystal molecules. This thin wall structure is formed on a pixel electrode layer of a single substrate. This LCD needs higher driving voltage and the response time is longer.

In addition, H. D. Liu et al. disclose a structure of a multi-domain homeotropic aligned LCD in "A Wide Viewing Angle Back-Side Exposure MVA-TFT-LCD with Novel Structure and Simple Process", The 19th International Display Research Conference, pp. 31–34, 1999. In the art, it utilizes a back side exposure (BSE) method to manufacture a surrounding wall-bump (SWB) structure. The wall-bump structure is formed around the pixel electrode on a single substrate having a thin film transistor (TFT). It also uses the combination effect of a fringe field and a bump structure to form multi-domains of the liquid crystal molecules and to increase the optical transmittance for the LCD, as shown in FIG. 2. The wall-bump 202 around the pixel electrode 201 is formed on the bus line of a thin film transistor substrate 203. The wall-bump around the pixel electrode has many advantages for an LCD. Neither rubbing process nor polymer stabilized ultraviolet curing process is needed in manufacturing the LCD. However, the LCD only has 60% light intensity of a conventional TN LCD.

All of the manufacturing processes of the aforementioned liquid crystal displays need to fill spacers between the upper and lower substrates to form the cell gap of liquid crystals. The uniformity of the cell gap is not easy to control. They also have light leakage problems, especially for a TN LCD under the operating mode of being normally white.

SUMMARY OF THE INVENTION

The present invention overcomes the difficulties and the disadvantages of the structure of conventional multi-domain liquid crystal displays. The primary object of the present invention is to provide a structure of a multi-domain wide-viewing angle liquid crystal display with a superimposed spacing wall-bump (SSWB) structure. The superimposed spacing wall-bump structure is formed on both upper and lower parallel substrates.

According to the invention, the SSWB structure formed on the upper and lower substrates is easy to design for the application in the larger pixel size and has larger process window. It also provides high pre-tilted angles for liquid crystal molecules and results in orderly alignment of the liquid crystal molecules to form multi-domain textures when an external voltage is applied.

In the preferred embodiments of a multi-domain wide-viewing angle liquid crystal display of the invention, the upper and lower substrates are parallel to each other. One of them has a color filter thereon and the other has thin film transistors thereon. Superimposed spacing wall-bumps are located at the pixel central portions on the color filter substrate and around the pixels on the TFT substrate. The SSWB at the central portion of a pixel on the color filter substrate is used to freeze the zone of the reverse disclination lines and the boundary of liquid crystal domains. It can also reduce the size of the zone of the disclination lines.

Another object of the present invention is to provide a manufacturing method for the aforementioned SSWB. The manufacturing method for the SSWB requires neither rubbing process nor polymer stabilized ultraviolet curing process. Also it does not need to fill spacers between the upper and lower substrates. It uses patterns of a photo mask to form uniform cell gap of liquid crystals. This manufacturing process is very simple and does not cause the light leakage problem. Therefore, it can increase the contrast ratio between the bright state and the dark state at various locations of the LCD.

The LCD of the present invention also increases the optical transmittance of the liquid crystal molecules. It has more than 85% light intensity of a conventional TN LCD and 20% higher optical transmittance than a conventional vertically aligned wide-viewing angle LCD.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 6(a) shows a central wall-bump structure that has a horizontal slot shaped wall-bump.

FIG. 6(b) shows a central wall-bump structure that has a vertical slot shaped wall-bump.

FIG. 6(c) shows a central wall-bump structure that has a Y-inverse-Y shaped wall-bump.

FIG. 6(d) shows a central wall-bump structure that has an X shaped wall-bump.

FIG. 6(e) shows a central wall-bump structure that has a +shaped wall-bump.

FIG. 6(f) shows a central wall-bump structure that has a herringbone shaped wall-bump.

FIG. 6(g) shows a central wall-bump structure that has a T-inverse-T shaped wall-bump.

FIG. 6(h) shows a central wall-bump structure that has a V-inverse-V shaped wall-bump.

FIG. 7(a) shows the optical texture of a multi-domain wide-viewing angle LCD shown in FIG. 2 when the absorbing axes of and of crossed polarizers are placed at 0° and 90° directions respectively, and a voltage is applied.

FIG. 7(b) shows the optical texture of a multi-domain wide-viewing angle LCD according to the present invention when the absorbing axes of crossed polarizers are placed at 0° and 90° directions respectively, and a voltage is applied.

FIG. 10 shows the comparison between the present invention and some conventional multi-domain WVA LCDs on the optical efficiencies.

DETAILED DESCRIPTION OF THE PREFERRED EMBODIMENTS

The present invention uses the combination effect of a pixel fringe field and a superimposed spacing wall-bump structure to control the directions of the pre-tilted angles of liquid crystal molecules and results in orderly alignment of liquid crystal molecules. Therefore, a multi-domain LCD cell is established and a wider viewing angle is obtained. According to the invention, the superimposed spacing wall-bump structure is formed on both upper and lower substrates. Compensating films and crossed polarizers are disposed outside the liquid crystal cell. In the preferred embodiments of the present invention, the upper and lower substrates are parallel to each other. One of them has a color filter thereon and the other has thin film transistors thereon. The compensating film is homeotropic aligned.

Figure 1:
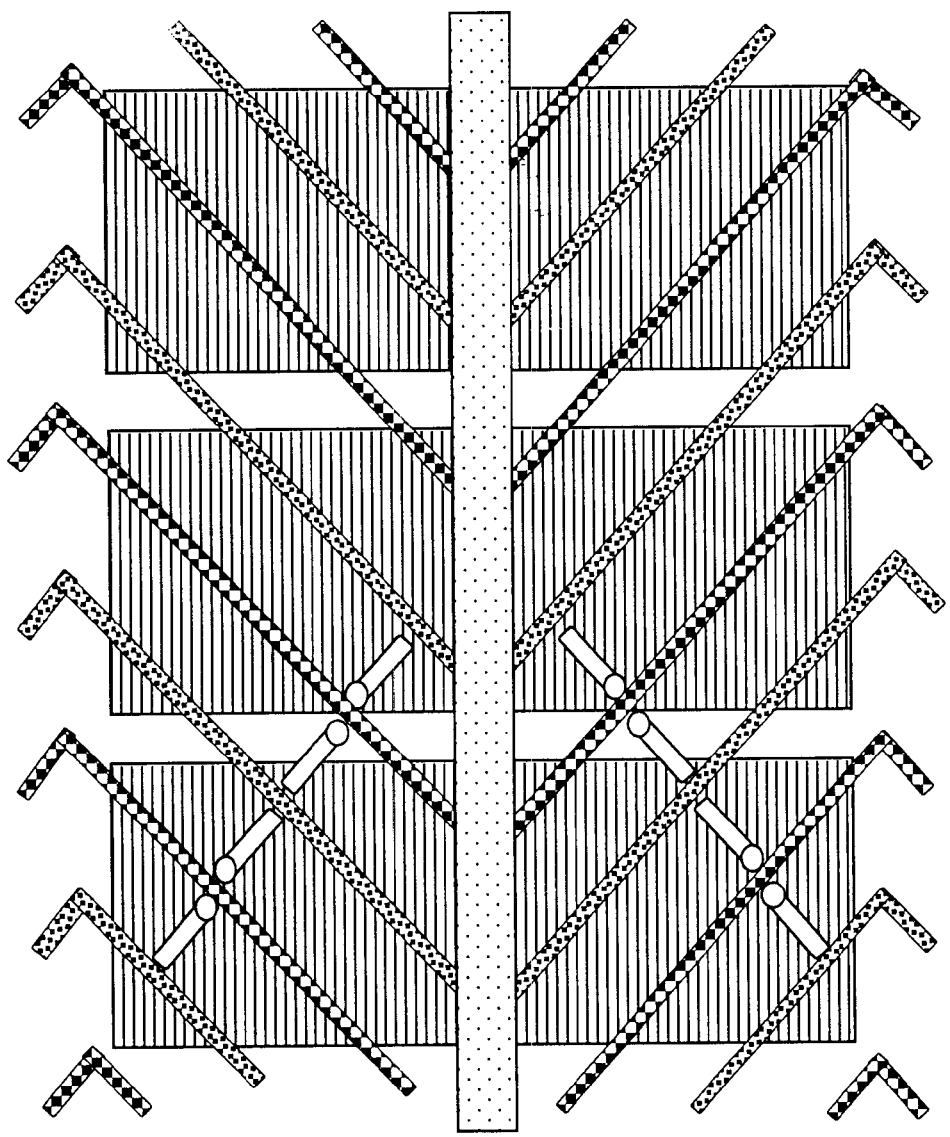
FIG. 1 shows Fujitsu's multi-domain vertically aligned liquid crystal display with a W-shaped bump structure.
Figure 2:
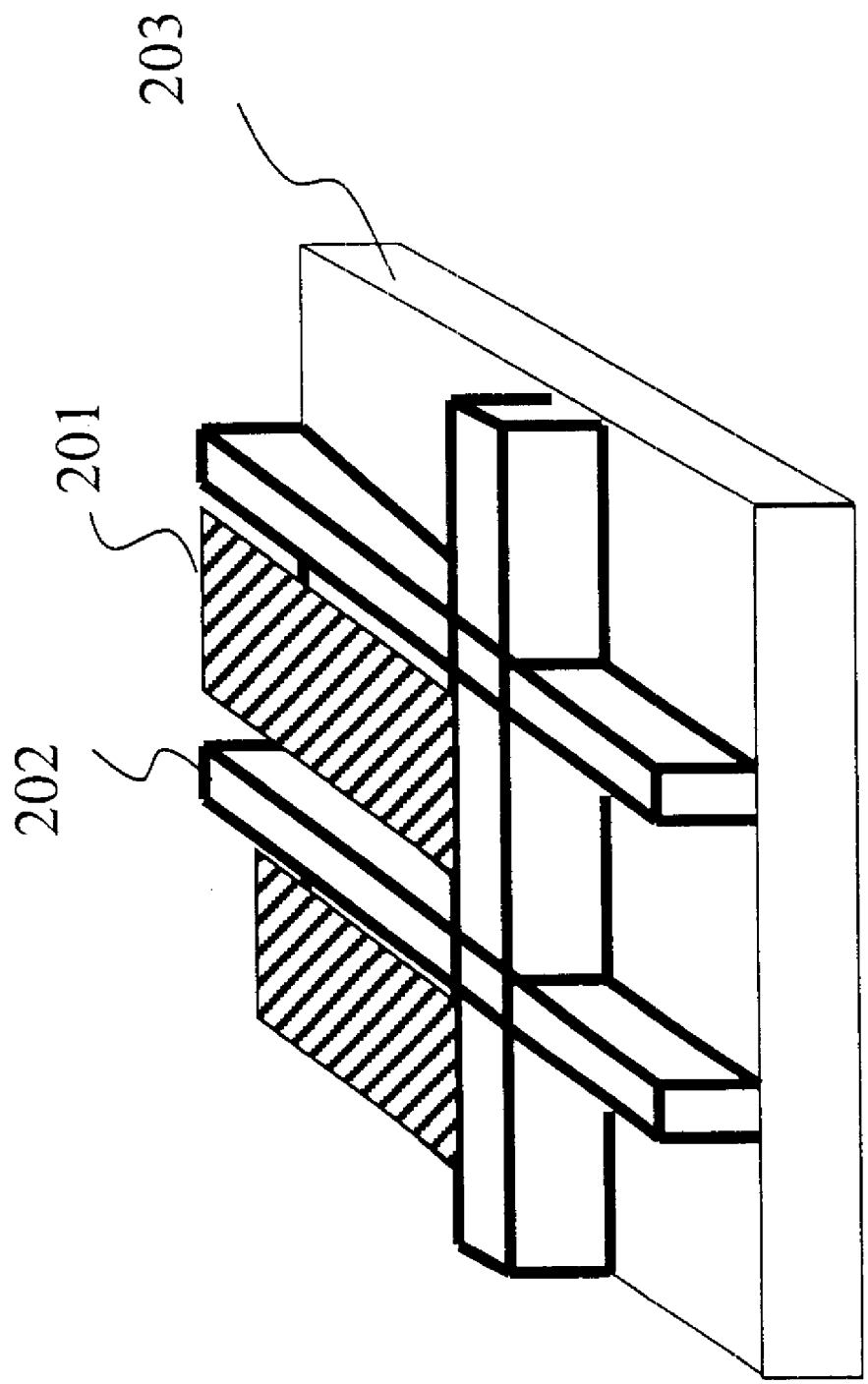
FIG. 2 is a top view of another conventional multi-domain vertically aligned liquid crystal display with a wall-bump structure.
Figure 3:
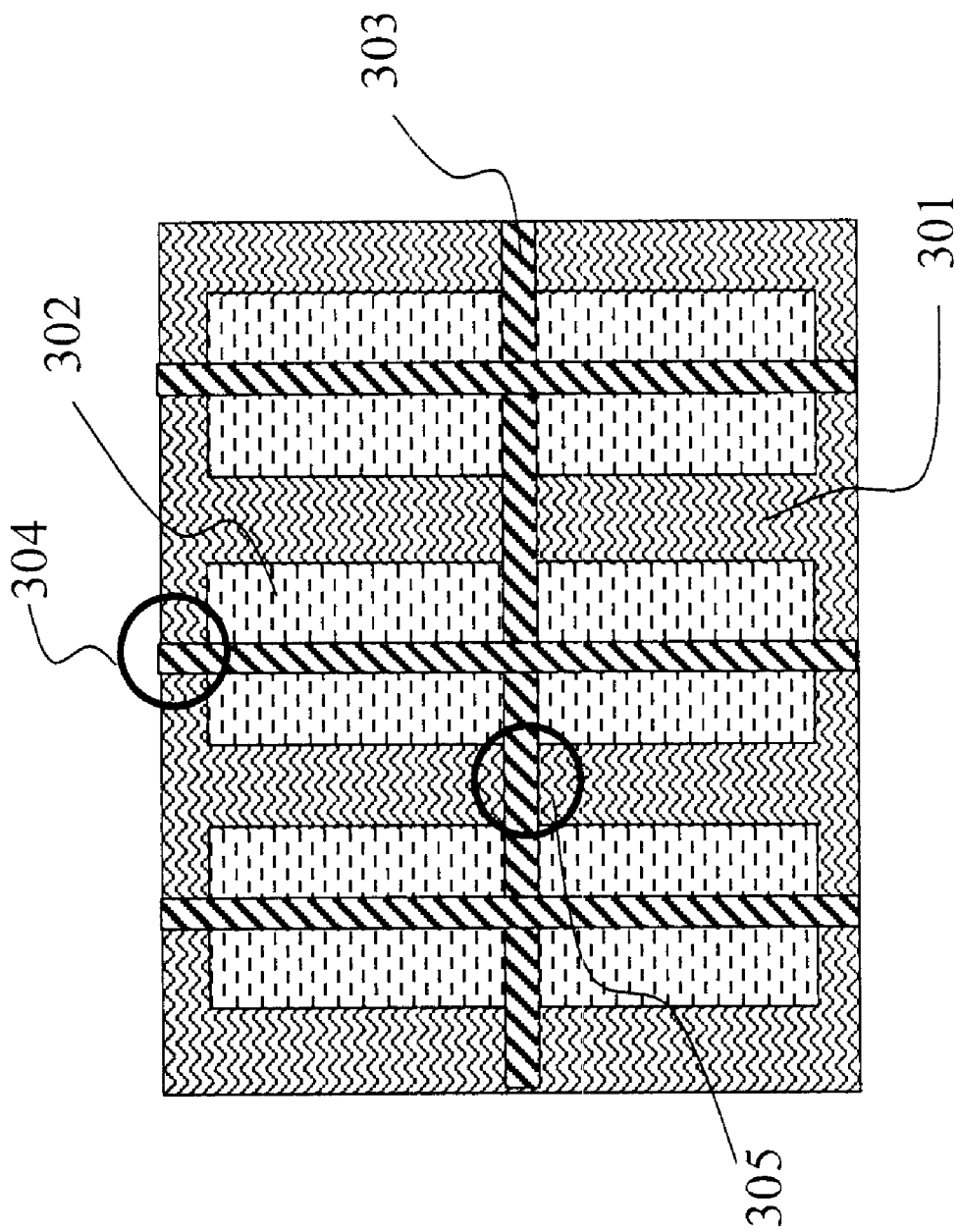
FIG. 3 is a top view of a multi-domain wide-viewing angle liquid crystal display with a superimposed spacing wall-bump structure according to the invention.

FIG. 3 is a top view of a multi-domain wide-viewing angle liquid crystal display with a superimposed spacing wall-bump structure according to the invention. Referring to FIG. 3, the superimposed spacing wall-bump structure 301 has a surrounding wall-bump structure on the TFT substrate that is the same as the wall-bump structure shown in FIG. 2. Bump 301 is formed around the pixel 302 on the TFT substrate while bump 303 is formed at the central portion of the pixel on the color filter substrate. The bump 303 formed on the color filter substrate is used to freeze the reverse disclination line and the boundary of liquid crystal domains.

As shown in FIG. 3, the wall-bumps formed on the upper and lower substrates stand against each other to form superimposed regions 304 and 305. The cell gap of liquid crystals between the two substrates is automatically formed without spacer spraying because of the superimposed regions. If the superimposed regions are designed to be around pixels within black matrix areas, the LCD is darker in a dark state under a normally black mode. Therefore, the LCD of the present invention can increase the contrast ratio between the bright state and the dark state at various locations of the LCD.

Figure 4:
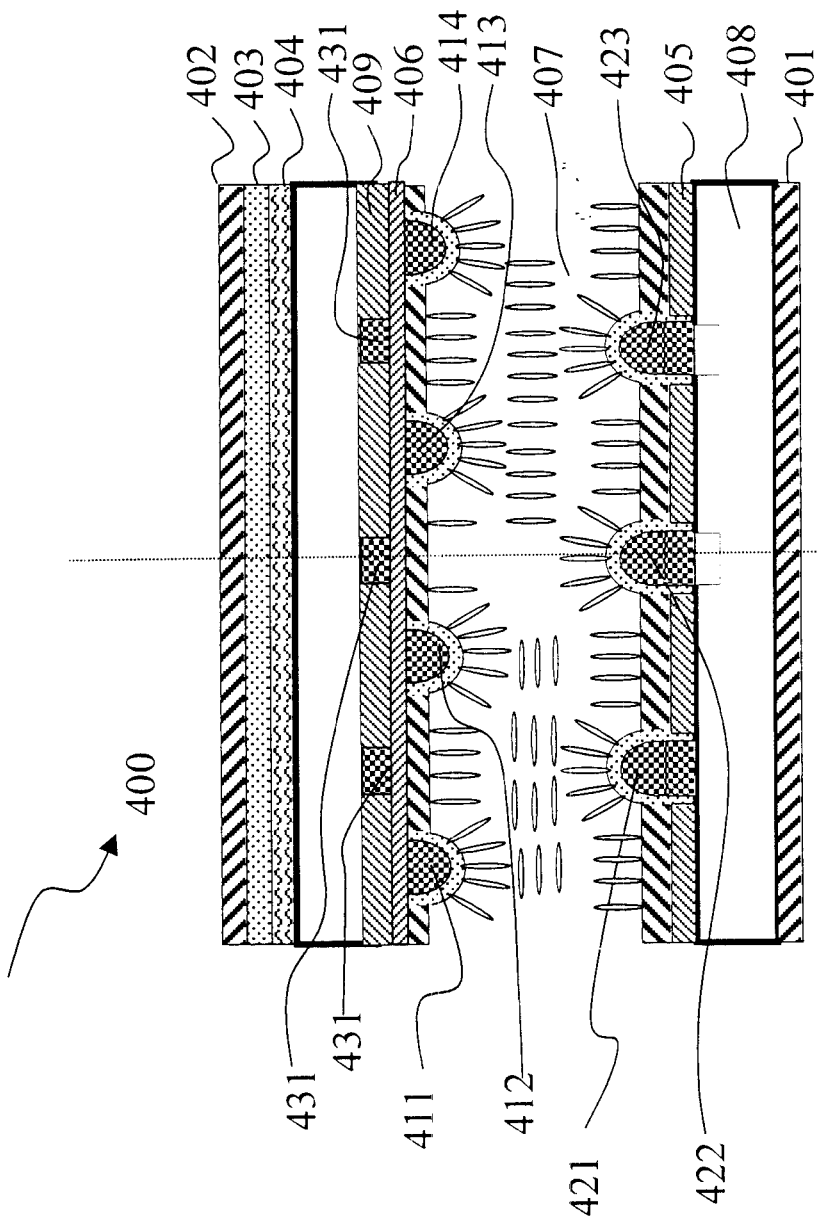
FIG. 4 is a cross-sectional view of a multi-domain wide-viewing angle liquid crystal display according to the invention.

FIG. 4 is a cross-sectional view of a multi-domain wide-viewing angle LCD according to the invention. Referring to FIG. 4, the LCD structure 400 comprises a liquid crystal cell, a pair of crossed polarizers 401 and 402, compensating films 403 and 404, and a plurality of superimposed spacing wall-bump structures. The liquid crystal cell comprises a pixel electrode layer 405, a common electrode layer 406, a TFT substrate 408 and a color filter substrate 409. A liquid crystal material 407 fills the space between the substrates 408 and 409. The pixel electrode layer 405 is formed on the TFT substrate 408 and the common electrode layer 406 is disposed on the color filter substrate 409. The exterior surfaces of the liquid crystal cell have respective crossed polarizers 401 and 402 disposed thereon. The compensating films 403 and 404 are disposed between the crossed polarizers 401 and 402.

Each SSWB structure comprises a surrounding wall-bump and a central wall-bump. As shown in FIG. 4, central wall-bumps 411~414 are formed on the common electrode layer 406 and disposed at the central portions of the pixels on the color filter substrate 409. Surrounding wall-bumps 421~423 are formed around the pixels on the TFT substrate 408. The pixel electrode layer 405 and the common electrode layer 406 are continuous except the texture area of the SSWB structure. The central wall-bumps 411~414 stand against and are superimposed on the surrounding wall-bumps 421~423 under the black matrix areas. The width of the wall-bumps 411~414 and 421~423 is less than that of the pixel electrode.

The central wall-bumps 411~414 direct and provide high pre-tilted angles for liquid crystal molecules. They can control the tilted direction more effectively than the surrounding wall-bumps 421~423. The optical texture of the multi-domains is thus formed when an external voltage is applied. Most of the twisted liquid crystal is constrained to the desired position. The disclination texture is frozen at the boundary of the SSWB structure. This will be described later and illustrated in FIG. 7.

Figure 5:
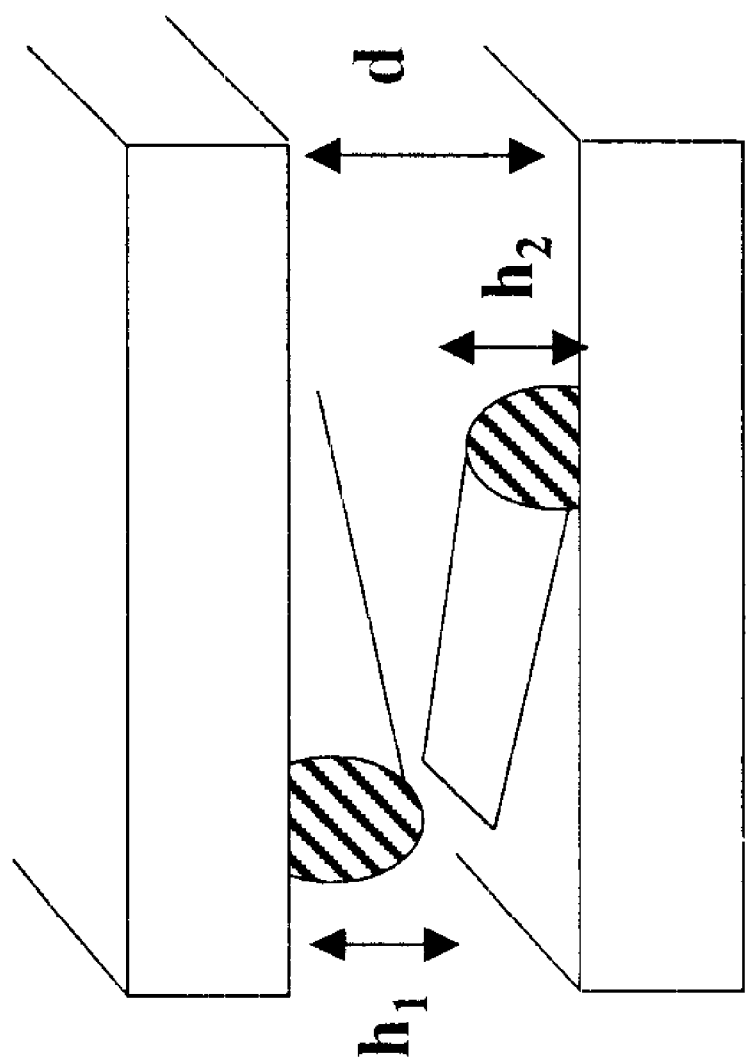
FIG. 5 shows that the cell gap of liquid crystals must be less than or equal to the summation of the heights of the wall-bumps on the upper and the lower substrates according to the invention.
Figure 6:
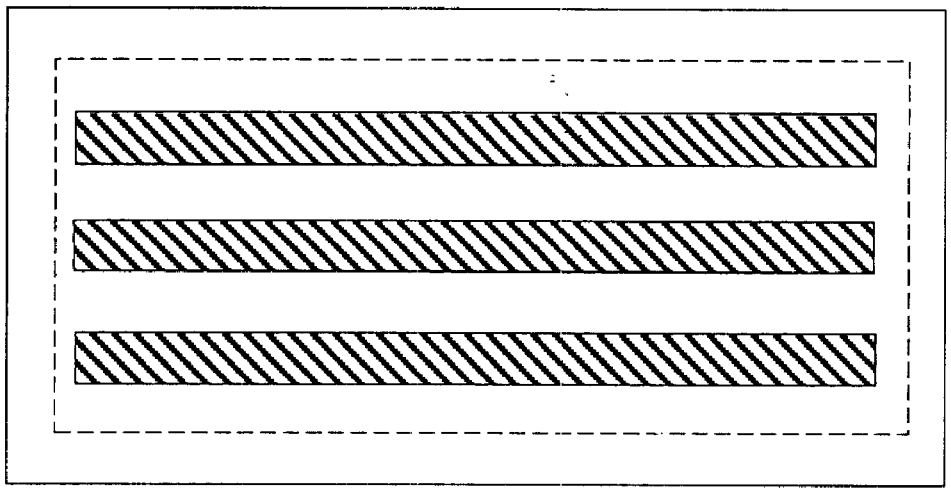
FIGS. 6(a)–6(h) show some wall-bump structures that have various shapes of the periodical configuration on the substrates according to the invention.
Figure 6:
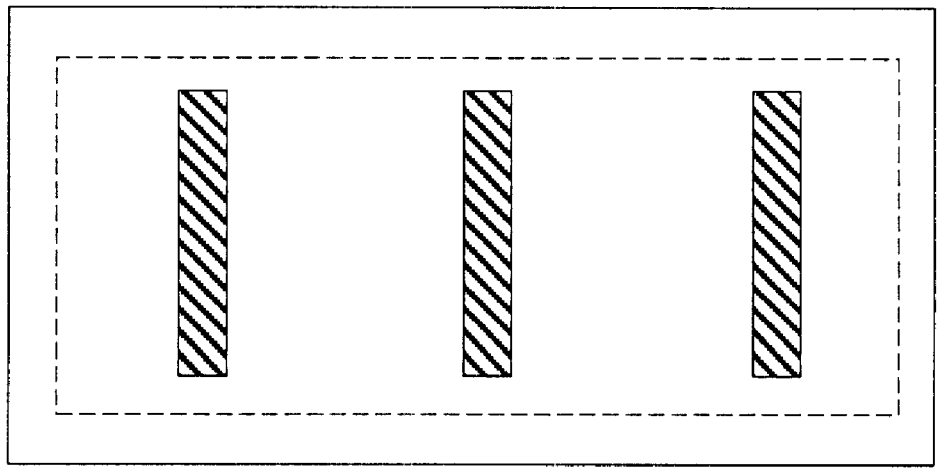
Figure 6:
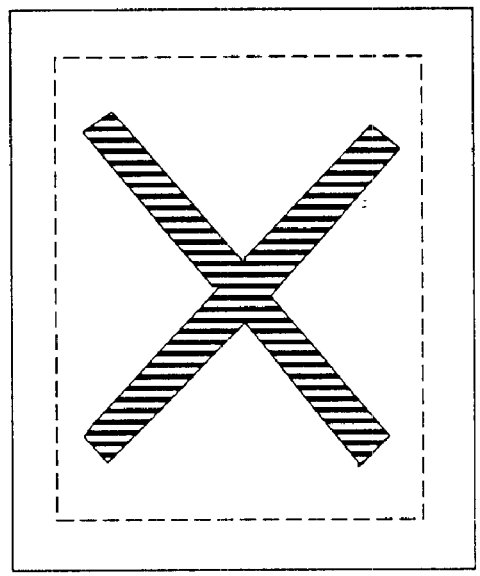
Figure 6:
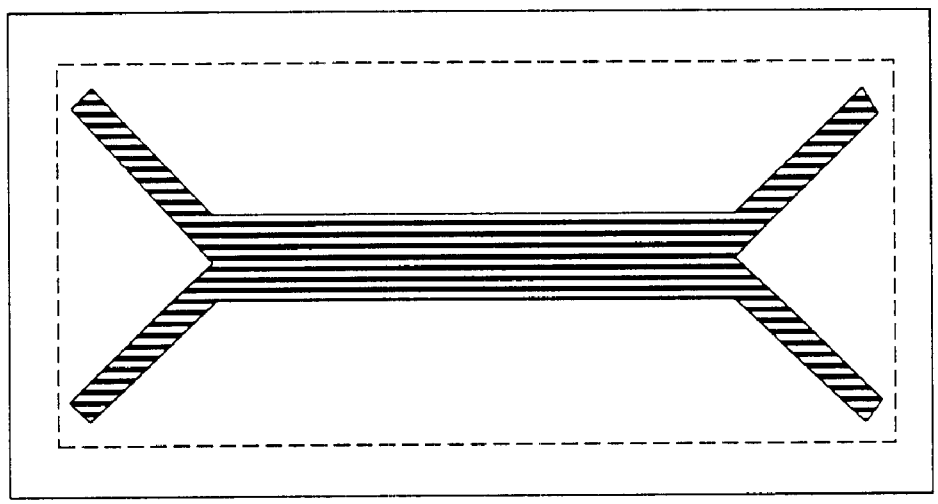
Figure 6:
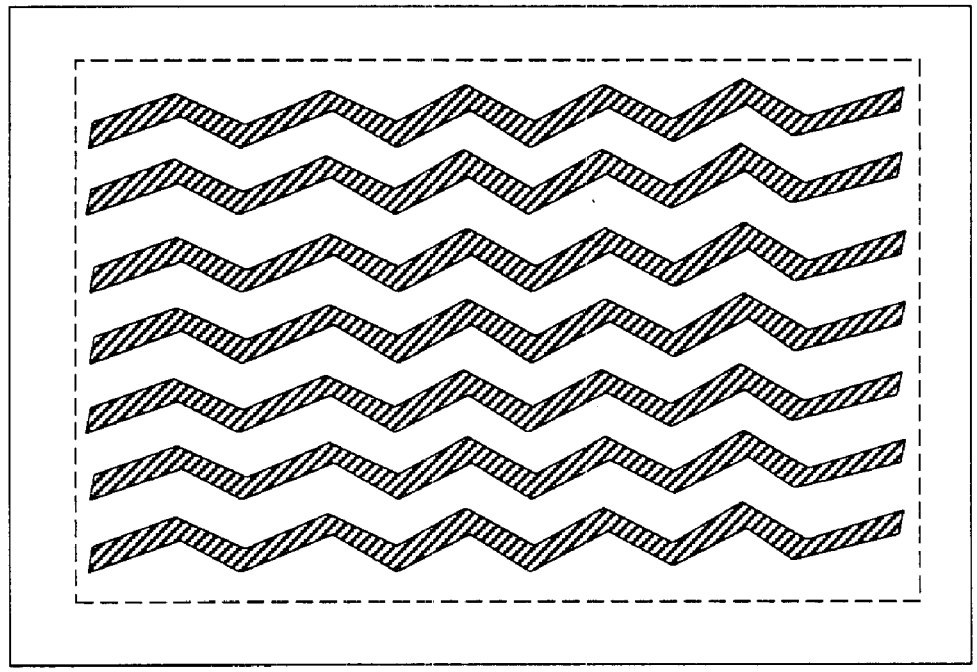
Figure 6:
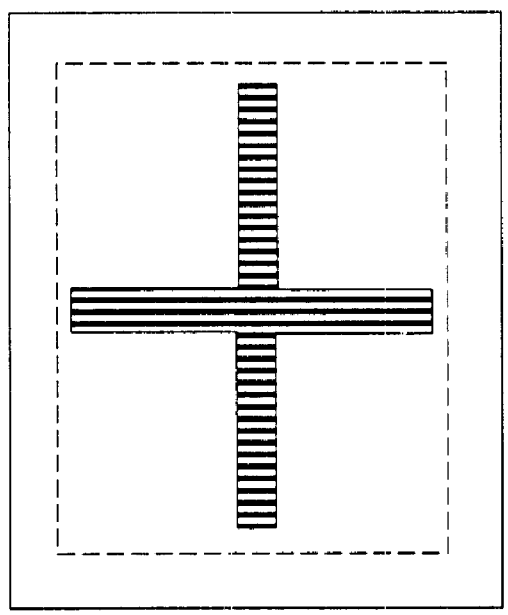
Figure 6:
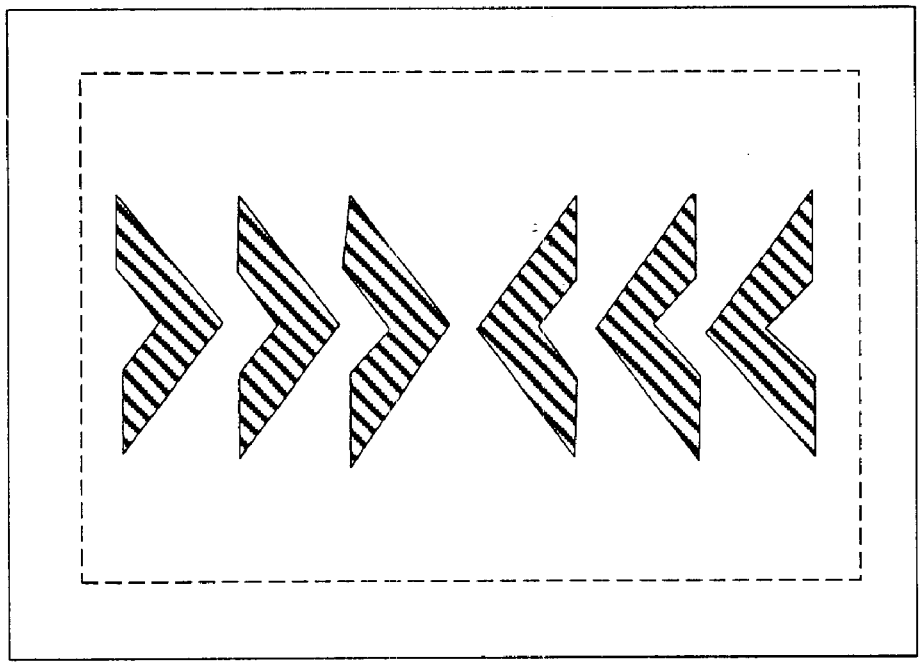
Figure 6:
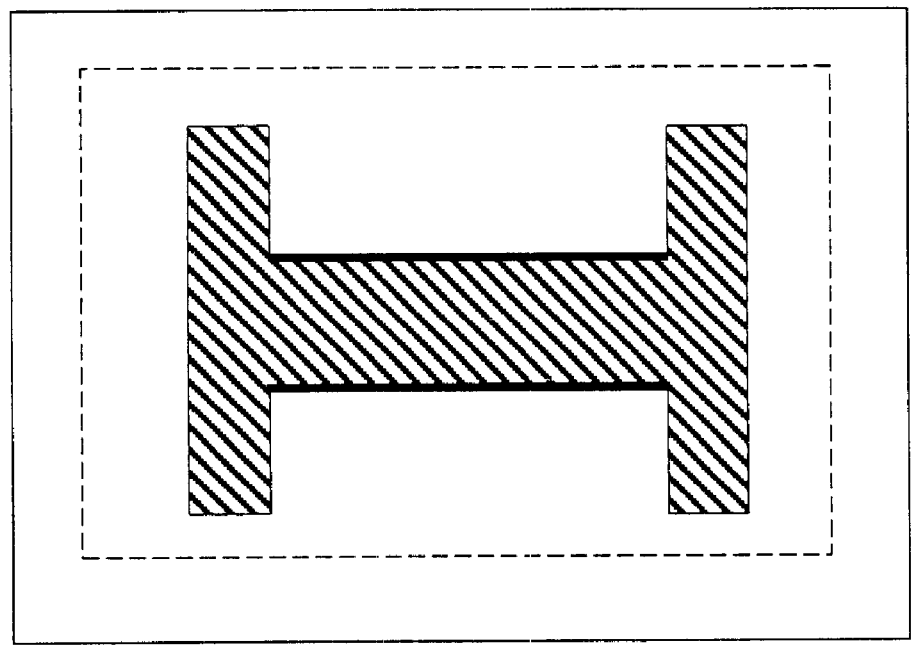

The cell gap of liquid crystals is not greater than the sum of the heights $h_1$ and $h_2$ of the wall-bumps on the upper and lower substrates respectively. This is illustrated in FIG. 5. The height of the wall-bump may range from 0.5 $\mu$m to 4 $\mu$m and the width from 1 $\mu$m to 30 $\mu$m in the preferred embodiments of the present invention.

The shape of the cross-sectional view of the wall-bump may be convex with rounded top or convex with rectangular top. The average tilted angle of the wall-bump may range from 3° to 70°. The central wall-bump structure may have periodic configuration with various shapes on the color filter substrate such as shapes of "horizontal slot", "vertical slot", "Y-inverse-Y", "X", "+", "herringbone", "T-inverse-T", or "V-inverse-V" and the combination of these shapes. FIGS. 6(a)–6(h) show some central wall-bump structures that have periodic configuration with various shapes on the substrate according to the invention.

The pixel may be shaped as quasi-rectangle, quasi-square or of mosaic arrangement. Typically the pixel size is chosen to have a 1:3 aspect ratio for a quasi-rectangular pixel. The pixel size may range from 3 $\mu$m to 350 $\mu$m on a side. The wall-bump is made of transparent material, non-transparent material, conductive material, or non-conductive material. The compensating films can be combinations of negative birefrigence and uni-axial birefrigence, such as a C-plate and an A-plate or at least one bi-axial film.

The pixel electrode may be a pixel unit driven by a switching device of an active matrix. Its structure can be co-plane with, above, or below the active matrix. The switching device of the active matrix may be a thin film transistor made of amorphous silicon, single silicon, poly-silicon, or low temperature poly-silicon, or a plasma address device.

FIG. 7(a) shows the optical texture of a multi-domain vertically aligned LCD shown in FIG. 2 when the absorbing axes 701 and 702 of crossed polarizers are placed at 0° and 90° directions respectively, and a voltage is applied. As shown in FIG. 7(a), the multi-domain vertically aligned LCD with SWB manufactured by a BSE method generates large and obvious zones 706 of the disclination lines around the center of the pixel 703. To increase the light intensity of the LCD, the optical texture must be fixed and restricted and the size of the zone of the disclination lines 706 must be reduced.

FIG. 7(b) shows the optical texture of a multi-domain wide-viewing angle LCD of the present invention when the absorbing axes of crossed polarizers are placed at 0° and 90° directions respectively, and a voltage is applied. Most of the twisted liquid crystal domain is constrained to the desired locations. Thus the disclination texture 707 is frozen at the boundary of the SSWB as shown in FIG. 7(b).

The manufacturing method for the SSWB needs neither rubbing process nor polymer stabilized ultraviolet curing process. Also this superimposed spacing method does not need to fill spacers to form uniform cell gap for liquid crystals. The assembly process of the multi-domain wide-viewing angle LCD of the invention using the superimposed spacing method is described in detail below.

In the preferred embodiments of the present invention, the assembly process of the LCD comprises mainly the manufacturing process for the SSWB and the later typical assembly process for the LCD. In accordance with the invention, the manufacturing process for the SSWB comprises the following steps: (a) Providing a pair of parallel substrates, wherein one of the substrates has a pixel electrode layer thereon and the other substrate has a common electrode layer thereon. (b) Manufacturing a first plurality of surrounding wall-bump structures on the pixel electrode layer and a second plurality of central wall-bump structures on the common electrode layer, wherein each surrounding wall-bump structure is around a pixel area on said pixel electrode layer and each central wall-bump structure is in the central portion of a pixel area on said common electrode layer, and the second plurality of central wall-bump structures stand against and are superimposed on the first plurality of surrounding wall-bump structures under the black matrix to form superimposed regions. (c) Applying a layer of alignment film on the first plurality of surrounding wall-bump structures and on the second plurality of central wall-bump structures respectively. (d) Dispensing conductive epoxy to establish electrical conduction for both substrates. (e) Aligning and pressing both substrates together, and utilizing the superimposed regions to automatically form the cell gap of the liquid crystals.

Following the step (e) are standard procedures which include cutting, breaking, filling LC, sealing, applying compensating films, applying polarizers and attaching to the LCD panel. The manufacture of the surrounding wall-bump structures in the step (b) may use a conventional BSE method or a standard photo-lithographic process. The surrounding wall-bump structure is formed on a TFT substrate while the central wall-bump structure is formed on a color filter substrate. The photo-lithographic process includes substrate formation, photo-resist coating, pre-bake, exposure, development, mid-bake and hard-bake.

Figure 8:
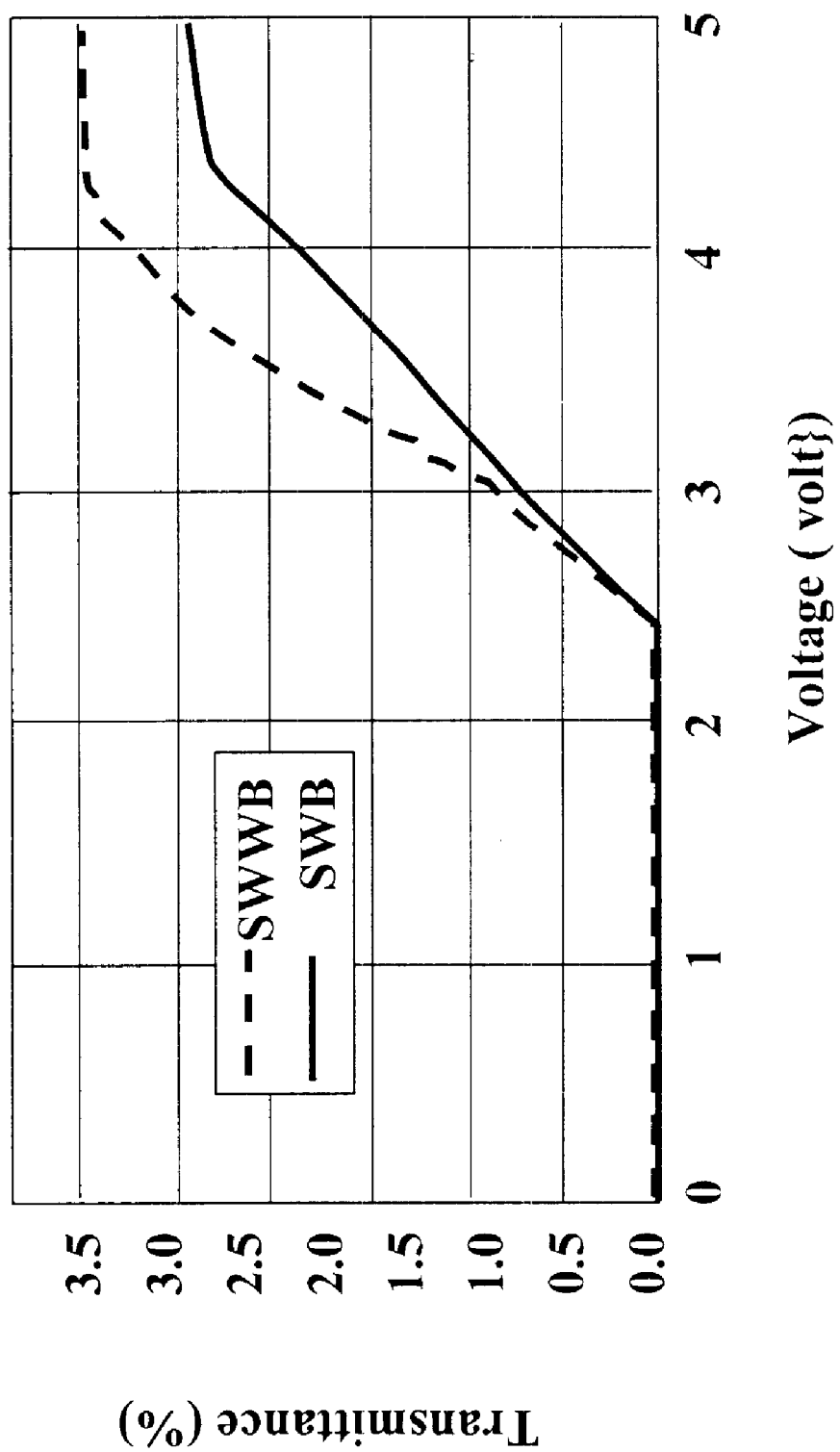
FIG. 8 shows the comparison between the present invention and the LCD shown in FIG. 2 on the optical transmittance.

FIG. 8 shows the comparison between the present invention and the LCD shown in FIG. 2 on the optical transmittance. The horizontal axis in FIG. 8 represents the driving voltage with unit volts and the vertical axis represents the transmittance of the multi-domain LCD. The dotted line and the solid line represent the optical transmittance by using SWB and SSWB respectively. As shown in FIG. 8, when the driving voltage of 5 volts is applied, the optical transmittance improvement is measured from 2.9% to 3.5%. This result reveals 20% improvement of the transmittance by the present invention and at least 85% improvement over the conventional twisted nematic LCD.

Figure 9:
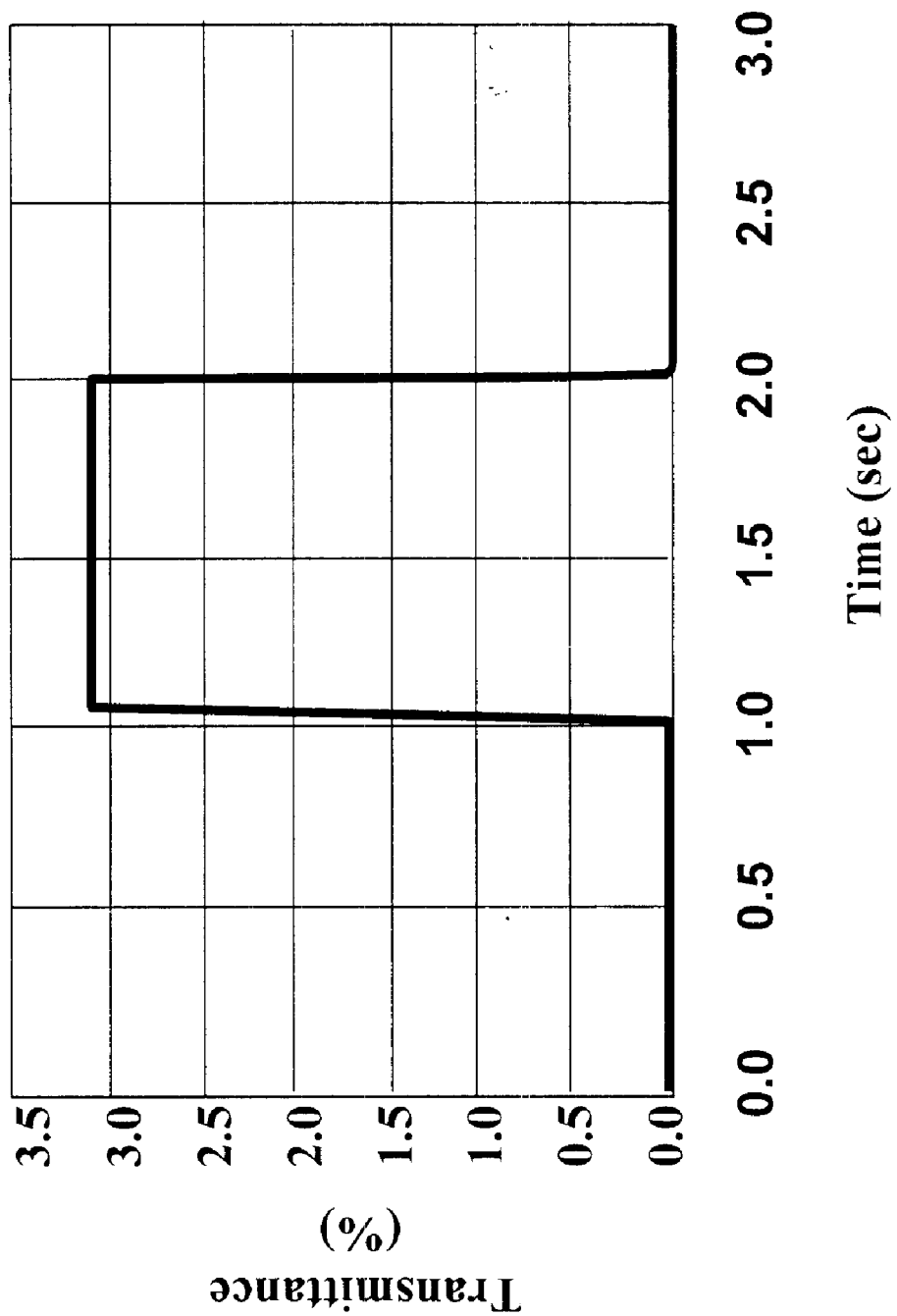
FIG. 9 shows the total response time of a multi-domain wide-viewing angle liquid crystal display according to the invention.

The optical responses of a VGA multi-domain liquid crystal VGA display of size 6.4 inches manufactured according to the invention is measured by switching the applied voltage between 0 and 5 volts. The total response time, the rise time plus the decay time, is about 33 ms, as shown in FIG. 9. The rise time is defined as the time interval when the transmittance between 0 to 5 volts is from 10% to 90% and the decay time is defined as the time interval when the transmittance between 0 to 5 volts is from 90% to 10%. This result reveals that the total response time is fast enough for its applications. Fast total response time is very important for computer animation. The total response time for a typical twisted nematic LCD is about 40 ms.

Since the multi-domain vertically aligned LCD operates in a normally black mode, the overlapping of the black matrix area at the marginal region of the pixel electrode is not necessary. By removing these areas and redesign whole parameters concerning TFT matrix array, the present invention can increase aperture ratio from 47% to more than 60%. FIG. 10 shows the comparison between the present invention and some conventional multi-domain WVA LCDs on the optical efficiencies. The optical efficiencies include the aperture ratio, the transmittance and the light intensity. Obviously, the optical efficiencies of the present invention are better than those of the conventional BSE multi-domain LCD. Also the manufacturing process of the invention does not need to fill spacers as conventional methods do.

On the other hand, in an embodiment of a quasi-rectangle arrangement with pixel size of 67.5 µm long by 203 µm wide, the present invention has wider design rule for the application in the larger pixel size because of the SSWB structure.

Although this invention has been described with a certain degree of particularity, it is to be understood that the present disclosure has been made by way of preferred embodiments only and that numerous changes in the detailed construction and combination as well as arrangement of parts may be-restored to without departing from the spirit and scope of the invention as hereinafter set forth.

What is claimed is:

1. A multi-domain wide viewing angle liquid crystal display comprising:

a first substrate with a pixel electrode layer formed thereon;

a second substrate with a common electrode layer formed thereon; liquid crystals filling a space between said first and second substrates to form a liquid crystal cell;

at least one polarizer disposed on exterior surfaces of said liquid crystal cell; and a plurality of superimposed spacing wall-bump structures disposed on said first and second substrates, each superimposed spacing wall-bump structure having a width less than that of a pixel electrode and forming a cell gap between said first and second substrates for said liquid crystal cell, wherein each superimposed spacing wall-bump structure has a surrounding wallbump structure disposed around a pixel area on said pixel electrode layer and a central wall-bump structure disposed at a central portion of said pixel area on said common electrode layer.

2. The multi-domain wide viewing angle liquid crystal display as claimed in claim 1, said liquid crystal display further comprising at least one compensating film disposed between a polarizer and one of said first and second substrates.

3. The multi-domain wide viewing angle liquid crystal display as claimed in claim 2, said compensating film being a combination of negative birefrigence and uni-axial birefrigence.

4. The multi-domain wide viewing angle liquid crystal display as claimed in claim 2, said compensating film being an A-plate or a C-plate.

5. The multi-domain wide viewing angle liquid crystal display as claimed in claim 1, said polarizer being a crossed polarizer.

6. The multi-domain wide viewing angle liquid crystal display as claimed in claim 1, said compensating film being homeotropic aligned and said liquid crystals being of negative type.

7. The multi-domain wide viewing angle liquid crystal display as claimed in claim 1, said first substrate being a substrate of thin film transistors.

8. The multi-domain wide viewing angle liquid crystal display as claimed in claim 1, said second substrate being a substrate of a color filter.

9. The multi-domain wide viewing angle liquid crystal display as claimed in claim 1, said superimposed spacing wall-bump structure comprising a transparent material.

10. The multi-domain wide viewing angle liquid crystal display as claimed in claim 1, said superimposed spacing wall-bump structure comprising a non-transparent material.

11. The multi-domain wide viewing angle liquid crystal display as claimed in claim 1, said superimposed spacing wall-bump structure comprising a conductive material.

12. The multi-domain wide viewing angle liquid crystal display as claimed in claim 1, said superimposed spacing wall-bump structure comprising a non-conductive material.

13. The multi-domain wide viewing angle liquid crystal display as claimed in claim 1, wherein each surrounding wall-bump structure superimposes a corresponding central wall-bump structure within a black matrix area.

14. The multi-domain wide viewing angle liquid crystal display as claimed in claim 1, wherein said surrounding wall-bump structure and said central wall-bump structure each having a height ranging from 0.5 µm to 4 µm, and a width ranging from 1 µm to 30 µm.

15. The multi-domain wide viewing angle liquid crystal display as claimed in claim 1, wherein said cell gap is not greater than the sum of the height of a surrounding wall-bump structure and the height of a central wall-bump structure.

16. The multi-domain wide viewing angle liquid crystal display as claimed in claim 1, said surrounding wall-bump structure and said central wall-bump structure each having a convex cross section with rounded top.

17. The multi-domain wide viewing angle liquid crystal display as claimed in claim 1, said surrounding wall-bump structure and said central wall-bump structure each having a convex cross section with rectangular top.

18. The multi-domain wide viewing angle liquid crystal display as claimed in claim 1, said surrounding wall-bump structure and said central wall-bump structure each having an average tilted angle ranging from 3° to 70°.

19. The multi-domain wide viewing angle liquid crystal display as claimed in claim 1, wherein each central wall-bump structure comprises a plurality of slot shaped wall-bumps.

20. The multi-domain wide viewing angle liquid crystal display as claimed in claim 1, wherein each central wall-bump structure comprises a Y-inverse-Y shaped wall-bump.

21. The multi-domain wide viewing angle liquid crystal display as claimed in claim 1, wherein each central wall-bump structure comprises a T-inverse-T shaped wall-bump.

22. The multi-domain wide viewing angle liquid crystal display as claimed in claim 1, wherein each central wall-bump structure comprises a V-inverse-V shaped wall-bump.

23. The multi-domain wide viewing angle liquid crystal display as claimed in claim 1, wherein each central wall-bump structure comprises a herringbone shaped wall-bump.

24. The multi-domain wide viewing angle liquid crystal display as claimed in claim 1, wherein each central wall-bump structure comprises an X-shaped wallbump.

25. The multi-domain wide viewing angle liquid crystal display as claimed in claim 1, wherein each central wall-bump structure comprises a +-shaped wall-bump.

* * * * *